(12) United States Patent
Aldossari et al.

(10) Patent No.: US 11,128,391 B1
(45) Date of Patent: Sep. 21, 2021

(54) SYSTEM AND METHOD FOR PREDICTING WIRELESS CHANNEL PATH LOSS

(71) Applicant: University of South Florida, Tampa, FL (US)

(72) Inventors: Saud Mobark Aldossari, Tampa, FL (US); Kwang-Cheng Chen, Tampa, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 17/104,764

(22) Filed: Nov. 25, 2020

Related U.S. Application Data

(60) Provisional application No. 63/054,982, filed on Jul. 22, 2020.

(51) Int. Cl.
*H04B 17/373* (2015.01)
*H04B 17/391* (2015.01)

(52) U.S. Cl.
CPC ......... *H04B 17/373* (2015.01); *H04B 17/391* (2015.01); *H04B 17/3911* (2015.01); *H04B 17/3913* (2015.01)

(58) Field of Classification Search
CPC  H04B 17/373; H04B 17/391; H04B 17/3911; H04B 17/3913
See application file for complete search history.

(56) References Cited

U.S. PATENT DOCUMENTS

| 10,382,285 | B2 * | 8/2019 | Patel | H04L 41/145 |
| 10,885,717 | B1 * | 1/2021 | Chopra | G06T 19/006 |
| 2008/0212659 | A1 * | 9/2008 | Usui | H04B 17/336 375/219 |
| 2009/0161683 | A1 * | 6/2009 | Allie | H04L 47/14 370/401 |
| 2012/0282962 | A1 * | 11/2012 | Madon | H04W 16/04 455/509 |
| 2014/0024406 | A1 * | 1/2014 | Lancaster | H04W 72/085 455/513 |
| 2014/0362840 | A1 * | 12/2014 | Wong | H04W 72/12 370/338 |
| 2015/0289081 | A1 * | 10/2015 | Chen | H04W 8/005 455/41.2 |

(Continued)

FOREIGN PATENT DOCUMENTS

WO    2019211792 A1    11/2019

OTHER PUBLICATIONS

5GCM, 5G Channel Model for bands up to 100 GHz, Tech. Rep., Oct. 2016.

(Continued)

*Primary Examiner* — Dominic E Rego
(74) *Attorney, Agent, or Firm* — Molly L. Sauter; Smith & Hopen, P.A.

(57) ABSTRACT

A system and method for applying supervised learning to model a second wireless channel environment based upon data collected for a first wireless channel environment. In various embodiments, regression techniques are used to overcome known channel modeling issues. Using the data of one particular communication environment, it is possible to predict a path loss model of a different communication environment. As such, the required number of measurements and the complexity of the model prediction is greatly reduced.

19 Claims, 5 Drawing Sheets

(56) References Cited

U.S. PATENT DOCUMENTS

| | | | | |
|---|---|---|---|---|
| 2016/0066322 | A1* | 3/2016 | Bontu | H04W 16/14 370/329 |
| 2017/0181127 | A1* | 6/2017 | Hampel | H04W 52/18 |
| 2018/0365975 | A1* | 12/2018 | Xu | G01V 3/12 |
| 2019/0281644 | A1* | 9/2019 | Hu | H04W 72/085 |
| 2020/0019842 | A1 | 1/2020 | Kim | |

OTHER PUBLICATIONS

Aldossari, S. et al, Machine Learning for Wireless Communication Channel Modeling: An Overview, Wireless Personal Communications, Mar. 2019, 106:41-70.

Haneda, K. et al., 5G 3GPP-like Channel Models for Outdoor Urban Microcellular and Macrocellular Environments, to be published in 2016 IEEE 83rd Vehicular Technology Conference (VTC 2016-Spring), May 2016.

Jiang, C. et al., Machine Learning Paradigms for Next-Generation Wireless Networks, in IEEE Wireless Communications, vol. 24, No. 2, pp. 98-105, Apr. 2017.

Jiang, Z. et al., Inferring Remote Channel State Information: Cramér-Rao Lower Bound and Deep Learning Implementation, IEEE GLOBECOM 2018.

Lu, T. et al., High-Speed Channel Modeling With Machine Learning Methods for Signal Integrity Analysis, IEEE Transactions on Electromagnetic Compatibility, vol. 60, No. 6, Dec. 2018.

MacCartney Jr., G. R., et al., Millimeter Wave Wireless Communications: New Results for Rural Connectivity, 5th Workshop on All Things Cellular, Proceedings in conjunction with ACM MobiCom, New York, NY, Oct. 7, 2016.

O'Shea, T. et al., Learning Approximate Neural Estimators for Wireless Channel State Information, CoRR, abs/1707.06260, 2017.

Piacentini, M. et al., Path loss prediction in urban environment using learning machines and dimensionality reduction techniques, Comput Manag Sci, 8:371-385, 2011.

Rangan, S. et al., Millimeter-Wave Cellular Wireless Networks: Potentials and Challenges, Proceedings of the IEEE, vol. 102, No. 3, Mar. 2014.

Sun, S. et al., Propagation Path Loss Models for 5G Urban Micro- and Macro-Cellular Scenarios, in 2016 IEEE 83rd Vehicular Technology Conference (VTC2016-Spring), May 2016.

Liu, L. et al., Channel Characterization and Modeling for 5G and Future Wireless System Based on Big Data, Wireless Communications and Mobile Computing, 2018.

Morocho-Cayamcela, M, E. et al., Machine Learning for 5G/B5G Mobile and Wireless Communications: Potential, Limitations, and Future Directions, IEEE Access, vol. 7, pp. 137184-137206, 2019.

Riihijarvi, J. et al., Machine Learning for Performance Prediction in Mobile Cellular Networks, IEEE Computational Intelligence Magazine, pp. 51-60, Feb. 2018.

Samuel, A. L. et al., Some Studies in Machine Learning Using the Game of Checkers, IBM Journal, vol. 3, No. 3, Jul. 1959.

Sultan, K. et al., Big Data Perspective and Challenges in Next Generation Networks, Future Internet 2018, 10, 56, Jun. 2018.

Sun, S. et al., A Novel Millimeter-Wave Channel Simulator and Applications for 5G Wireless Communications, 2017 IEEE International Conference on Communications (ICC), May 2017.

Sun, S. et al., Investigation of Prediction Accuracy, Sensitivity, and Parameter Stability of Large-Scale Propagation Path Loss Models for 5G Wireless Communications, IEEE Transactions on Vehicular Technology, vol. 65, No. 5, pp. 2843-2860, May 2016.

Wang, J. et al., Thirty Years of Machine Learning: The Road to Pareto-Optimal Wireless Networks, IEEE Communications Surveys & Tutorials, vol. 2, No. 3, pp. 1472-1514, Third Quarter 2020.

Wang, C.-X. et al., A Survey of 5G Channel Measurements and Models, IEEE Communications Surveys & Tutorials, vol. 20, No. 4, pp. 3142-3168, Fourth Quarter 2018.

Zhang, Y. et al., Air-to-Air Path Loss Prediction Based on Machine Learning Methods in Urban Environments, Hindawi, Wireless Communications and Mobile Computing, vol. 2018, Article ID 8489326, 9 pages, Jun. 2018.

Zhao, X. et al., A New SVM-Based Modeling Method of Cabin Path Loss Prediction, Hindawi Publishing Corporation, International Journal of Antennas and Propagation, vol. 2013, Article ID 279070, 7 pages, Apr. 2013.

* cited by examiner

SYSTEM AND METHOD FOR PREDICTING WIRELESS CHANNEL PATH LOSS

CROSS-REFERENCE TO RELATED APPLICATIONS

The present invention claims priority to U.S. Provisional Patent Application No. 63/054,982 filed on Jul. 22, 2020, the contents of which are incorporated by reference herein in their entirety.

BACKGROUND OF THE INVENTION

State-of-the-art channel modeling is the process of predictively incorporating wireless channel parameters into a channel model using a minimum number of measurements of the communication environment. Radio propagation models can be traditionally obtained via Deterministic and Stochastic Channel Models and by applying a regular statistical method to build a model. However, these traditional methods are becoming more complex and time consuming due to the deployment of new technologies/frequency bands and increased data traffic.

Accordingly, what is needed in the art is an improved channel modeling method that is less time consuming and less complex.

SUMMARY OF THE INVENTION

In various embodiments, the present invention provides a system and method for applying supervised learning to model a second wireless channel environment based upon data collected for a first wireless channel environment. In the embodiments of the present invention, regression techniques are used to overcome known channel modeling issues. Using the data of one particular communication environment, it is possible to predict a path loss model of a different communication environment. As such, the required number of measurements and the complexity of the model prediction is greatly reduced.

The present invention provides a novel method for wireless channel modeling utilizing machine learning (ML) to revolutionize system design for 5G and beyond. In various embodiments, ML techniques, and in particular, supervised learning methods, are used to predict the wireless channel path loss, which is a key component of channel modeling.

In one embodiment, the present invention provides a computer implemented method for predicting a path loss model for a wireless channel which includes, creating a first wireless channel environment comprising a plurality of channel parameters, collecting measurement data for the first wireless channel environment, performing data processing to cleanse the measurement data of the first wireless channel environment and performing AI-based techniques on the cleansed measurement data to predict a path loss for a second wireless channel environment, wherein the second wireless channel environment has one or more different channel parameters than the first wireless channel environment. The method further includes, evaluating the predicted path loss for the second wireless channel environment and generating a path loss model for the second wireless channel environment.

The channel measurement parameters may be selected from, distance, frequency, bandwidth, transmission power, scenario, polarization, transmission array type, receiver array type, antenna, antenna Azimuth and elevation.

In a particular embodiment, the measurement data for the first wireless channel environment comprises may be collected from an NYU simulation for an urban micro environment and the second wireless channel environment may be an urban macro environment.

The measurement data for the first wireless channel environment may be selected from T-R (transmitter-receiver) separation distance (m), time delay (ns), receiver power (dBm), RMS (root-mean-square) delay spread (ns), elevation AoD (degree), Azimuth AoD (degree), Azimuth AoA (degree) and elevation AoA (degree).

Various AI-based techniques may be used, including, but not limited to linear regression, multiple linear regression, support vector machine regression, decision tree regression and random forest regression. Additionally, various techniques for evaluating the resulting regression line may include mean square error (MSE) and R-square comparison techniques.

In another embodiment, the present invention provides a non-transitory computer-readable medium, the computer-readable medium having computer-readable instructions stored thereon that, when executed by a computing device processor, cause the computing device to, create a first wireless channel environment comprising a plurality of channel parameters, collect measurement data for the first wireless channel environment, perform data processing to cleanse the measurement data of the first wireless channel environment, perform AI-based techniques on the cleansed measurement data to predict a path loss for a second wireless channel environment, wherein the second wireless channel environment has one or more different channel parameters than the first wireless channel environment, evaluate the predicted path loss for the second wireless channel environment and generate a path loss model for the second wireless channel environment.

The present invention additionally provides, a system for predicting a path loss model for a wireless channel that includes a processor and a non-transitory computer-readable medium operably coupled to the processor, the computer-readable medium having computer-readable instructions stored thereon that, when executed by the processor, cause the system to, create a first wireless channel environment comprising a plurality of channel parameters, collect measurement data for the first wireless channel environment, perform data processing to cleanse the measurement data of the first wireless channel environment, perform AI-based techniques on the cleansed measurement data to predict a path loss for a second wireless channel environment, wherein the second wireless channel environment has one or more different channel parameters than the first wireless channel environment, evaluate the predicted path loss for the second wireless channel environment and generate a path loss model for the second wireless channel environment.

As such, the present invention provides an improved channel modeling method that is less time consuming and less complex than other methods currently known in the art.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE INVENTION

In various embodiment, machine learning (ML) techniques, such as supervised learning methods, are used to predict the wireless channel path loss of a variety of environments based upon a specific dataset acquired from a different environment.

The propagation signal of communication system fundamentals is primary focused on channel modeling, particularly for new frequency bands, such as MmWave. Machine learning can facilitate rapid channel modeling for 5G and beyond wireless communication systems due to the availability of partially relevant channel measurement data and models. When irregularity of the wireless channels leads to a complex methodology to achieve accurate models, appropriate machine learning methodology can be used to explore the possibility of reducing the complexity of and increasing the accuracy of the models.

In various embodiments, the present invention demonstrates alternative procedures beyond traditional channel modeling to enhance the wireless channel path loss models, utilizing machine learning (ML) techniques, thereby alleviating issues associated with channel complexity and the time-consuming process required to acquire the measurements of the communication environment being modeled. In various embodiments, the system and method of the present invention utilizes measurement data from a first communication environment to successfully predict the wireless channel path loss model of a second communication environment that is different than the first communication environment.

From the computational aspect, channel modeling is considered to be a form of data mining, and machine learning techniques are considered as a valid solution to predict the channel model that does not rely on empirical and deterministic methods. Machine learning techniques have been applied to predict the carrier frequency offset (CFO) and have provided improved results in the application of machine learning to wireless channel modeling.

The prediction of accurate channel models is critical in modern artificial intelligence (AI) assisted communication systems. Furthermore, machine learning (ML) in beneficial for the extraction of useful information from the vast amount of channel measurement data available in the wireless communication system. In accordance with various embodiments, the machine learning methods of the present invention are shown to be suitable and applicable for channel modeling and to provide an improvement over traditional methods.

Figure 1:
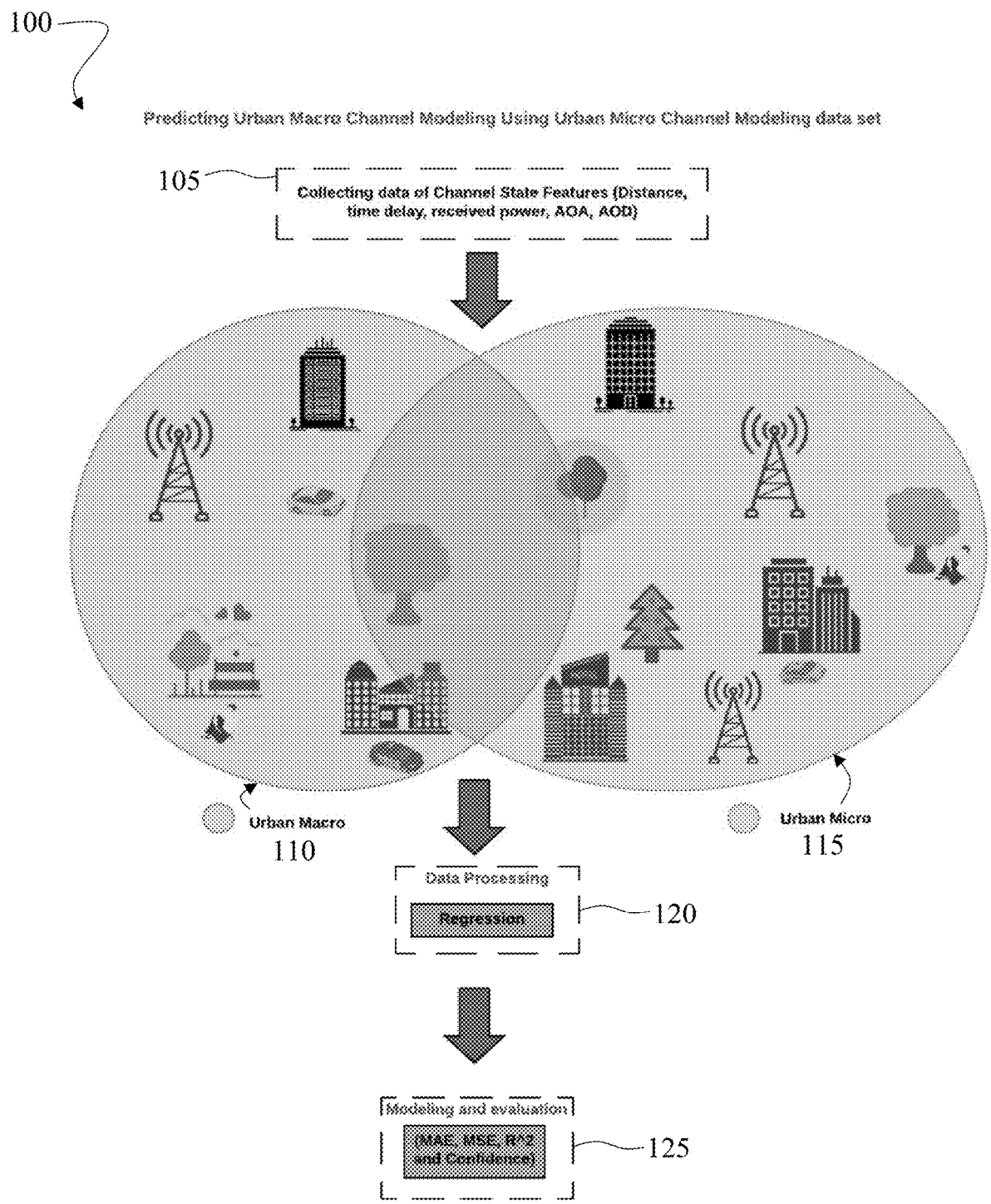
FIG. 1 illustrates a method to reduce the number of measurements required in wireless channel modeling, in accordance with an embodiment of the present invention.

FIG. 1 illustrates an exemplary embodiment of the present. In the embodiment illustrated in FIG. 1, a method 100 is implemented using measurement data from an urban micro environment 115 to predict a path loss model for an urban macro environment 110. As shown, the method 100 includes collecting data of the channel state features of the urban micro environment 105, processing the data and performing regression 120 to generate the path loss model 125 for the urban macro environment 105. In the present invention, machine learning techniques are used to predict a wireless channel path loss model for a variety of environments that can then be used to predict a wireless channel path loss model based upon reliable data from a different environment. The present invention is in contrast with traditional methods for wireless channel path loss prediction, which require acquiring a tremendous number of measurements in a particular environment and then obtaining a channel path loss model for that particular environment using regular statistical techniques.

The general mathematical model can be shown as:

$$y(t) = x(t) * h(\tau, t) = \int_{-\infty}^{\infty} h(\tau, t) x(t - \tau) d\tau \tag{1}$$

Where y(t) is the received signal, x(t) is the transmitted signal, * is the convolution sign and h($\tau$, t) is the delay spread function, with respect to time and delay. The characteristics of the wideband channel, such as power delay profile (PDF), RMS delay spread, and other channel parameters, are derived from the channel impulse response h($\tau$, t). The received passband signal is shown below:

$$Y(d, t) = \sum_{i=1}^{L-1} \alpha_i s(t - \tau_i) + n(t) \tag{2}$$

Large scale fading (LSF), usually due to the objects that shadow the signal, explains the main characteristics of the channel, such as path loss, shadow, angular spread, etc. Moreover, LSF cases examine the relationship between the path loss and the separated distance between the Tx and Rx in different environments, such as suburban environments. The average power delay profile (APDP) is shown below:

$$APDP(\tau) = \frac{1}{N} \sum_{i=1}^{L} |h(t - \tau_i)|^2 \tag{3}$$

Common methods for predicting the path loss in a channel model may vary, based upon various characteristics of the channel, such as the specific communication environment, types of antennas and frequency scales. Inferring the wireless channel path loss of a particular communication environment using existing path loss models or data from one or more different environments has not been well investigated in the literature. There are non-ML types of path loss models that are used to predict the signal loss of the propagated link via a wireless channel. These path loss models are briefly explained in the following discussion.

A close-in (CI) model is generally implemented for LOS (line-of-sight) and NLOS (non-line-of-sight) for all urban microcells (UMi), urban macrocells (UMa), and InH by using close-in reference distance based on Fariis' law. The general version of the close-in model is:

$$PL^{CI}(f, d)[\text{dB}] = FSPL(f, 1, m) + 10n\log_{10}\left(\frac{d}{d_o}\right) + X_\sigma^{CI} \quad (4)$$

The parameter FSPL (free space path loss) is the free space model in dB, n is the path loss exponent (PLE) which illustrates how the path loss (PL) varies with multipath propagation distance and $d_o$ is the reference distance, which is set to 1 m since there is rarely shadowing in the first meter, thereby simplifying the equation. The above PL models have the form of a linear regression model, whereas other path loss models, such as the following models, can be applied to multiple linear regression due to the many channel features.

A close-in with frequency (CIF) dependent exponent model has been previously proposed, wherein the CIF model is dependent upon the frequency of the channel. Close-in with frequency dependence is an extension of the CI model which incorporates frequency dependency. The general model of the CIF model shown as:

$$PL^{CIF}(f, d) = FSPL(f, 1, m) + 10n\left(1 + b\left(\frac{f - f_0}{f_0}\right)\right)\log_{10}\left(\frac{d}{1m}\right) + X_\sigma^{CIF} \quad (5)$$

Note: b is a parameter that captures the slop or the dependence of the path loss of the weighted average of the reference frequencies $f_0$ and is positive if both PL and f increase.

The above model has been compared with the path loss model for both μWave and MmWave in various scenarios, such as UMa and UMi. All of the comparisons illustrated a good prediction of the channel path loss using a large amount of data. It was shown that the CI model was most suitable for outdoor cases due to the close-in free space reference, whereas, CIF has a better performance for the indoor environments, due to its small standard deviation values. The path loss exponent in the CI and CIF models shows loss with distance for urban macro, and then urban micro, which seems appropriate due to the obstructions blocking the signal from the lower base stations, while urban macro is commonly higher than the micro communication.

A floating-intercept (FI) model, also referred to as alpha-beta (AB) path loss model, is also known in the art. This PL model can be combined with log-normal shadowing as shown:

$$PL^{FI}(f,d)[\text{dB}] = \alpha + 10\beta \log_{10}(d) + X_\sigma^{FL} \quad (6)$$

The values of α and β can be obtained using the least square fitting as a slope and floating intercept, respectively. Also, the shadow fading is represented by $X_\sigma^{FL}$ following a Gaussian random variable with zero mean and standard deviation σ.

An ABG (alpha-beta-gamma) model is the current 3GPP 3D model and values of the model may change based upon the base station location as:

$$PL^{ABG}(f, d)[\text{dB}] = 10\alpha\log_{10} + \beta + 10\gamma\log_{10}\left(\frac{f}{1 \text{ GHz}}\right) + X_\sigma^{ABG} \quad (7)$$

The ABG model is used to measure how the path loss (PL) increases with distance and α is the slope of PL with log distance. β is the optimized floating offset in dB, γ is the PL variation dependence over a frequency in GHz and $X_\sigma^{ABG}$ is the fading (SF) in dB. Since there are three parameters, the ABG PL model always has a lower shadow fading standard deviation than other PL models.

As exemplified by the embodiments of the present invention, estimating a communication channel path loss can be solved by machine learning (ML) techniques to overcome challenging issues, such as complexity and time consumption due to the tremendous number of measurements of the communication environment that are typically required. While, state-of-the-art wireless communication channel modeling is performed using Deterministic and Stochastic channel methodologies, the present invention utilizes ML techniques, such as supervised learning methods, to predict the wireless channel path loss of a variety of environments based upon a particular dataset. Application scenarios of the present invention include mmWave bands and vehicle-to-vehicle communication channels. In various embodiments of the invention, machine learning techniques are applied to develop alternative procedures to enhance the communication channel path loss models.

The following detailed description presents a novel method for applying ML to estimate wireless channel parameters using various regression methods. Regression is a commonly known supervised learning technique. Regression techniques use least square error (LSE) to minimize the square of the error between the observed responses in the dataset and to predict the most accurate model. Regression is one of the main methods used in machine learning where regression models learn the mechanism based on a dataset from prior measurements or simulations. After the learning processes are completed, the model coefficients can be obtained. Previous researchers have applied support vector and DNNs (deep neural network) regressions, followed by a compression technique, to control the high-speed channel modeling errors. While all of these techniques have helped to reduce the wireless channel modeling complexity, the system and method of the present invention further expand upon these techniques.

The machine learning techniques employed in the method of the present invention are based upon linear and multiple linear regression algorithms. Multiple linear regression techniques utilize the advantages of other channel modeling features to enhance the path loss prediction, as compared to regular linear regression. Furthermore, the present invention additionally investigates how the wireless channel features affect the path loss prediction. The reason for using regression techniques instead of other machine learning methods is due to the desire to predict continuous values.

$$Y_i = f_i(X) + \epsilon_i \quad (8)$$

Y is the dependent response which is, in the present invention, the wireless channel path loss. X is the independent variable in the form of $X=[x_i, x_2, \ldots x_p]$, which is the channel state information (CSI) features such as distance, time delay, received power, azimuth AoD, elevation AoD, azimuth AoA, RMS Delay Spread and frequency (GHz). In order to make a prediction of Y based upon new data, $\hat{f}(X)$ needs to be estimated. Thus, the estimated coefficients have to be as accurate as possible to enhance the accuracy. Path loss models suppose to be applicable and have the form of regressions algorithms, such as linear regression for Floating-Intercept (FI) model. While other path loss models, such as the Alpha-Beta-Gamma (ABG) model can be applied to multiple linear regression due to the other channel features in the previous description. By considering linear regression where distance is the only channel feature used to estimate the path loss model, as shown below, and estimating the parameters can be seen in equation 14.

$$\hat{Y} = \hat{\beta}_0 + \sum_{i=1}^{k} \hat{\beta}_i X_i \qquad (9)$$

$$E(\beta_0, \beta_i) = \sum_{i=1}^{p} [y_i - (\beta_0 + \beta_i X_i)]^2 \qquad (10)$$

By applying this approach to estimate the coefficient parameters and then characterizing the theoretical loss, L is obtained.

$$\underset{j}{\mathrm{argmin}}\, L = \frac{1}{N} \sum \left(\hat{Y}(k) - Y(k)\right)^2 \qquad (11)$$

Multiple linear regression techniques take advantage of other channel modeling features to enhance the path loss prediction, as compared to regular linear regression. Furthermore, the inventive concept examines how the wireless channel features affect the path loss prediction. Machine learning techniques are adopted to estimate the channel modeling parameters that reduce the estimation error e(n). An example of the ML techniques is a multiple linear regression method that can be used to predict the modeling parameters of the channel following the ABG model that was introduced by the 3GPP. Multiple linear regression is a supervised learning method and the goal is to infer and predict a function by reducing the error using the training data to predict the target by using a machine learning method that provides a better estimation $\hat{f}$.

In the present invention, a dataset that is divided into two parts is used, which includes training and testing data, and wherein the training set consists of 70% of the dataset and the testing set consists of 30% of the dataset, as previously known. The multiple linear equation can be seen as follows:

$$f_i(x) = \beta_0 + \beta_1 X_1 + \ldots + \beta_i X_i + \varepsilon \qquad (12)$$

The estimate of the response variable Y (PL) using X as CSI (channel state information) and minimizing the erroneous follows:

$$\hat{y}_i = \hat{\beta}_0 + \hat{\beta}_1 \hat{X}_1 + \ldots + \hat{\beta}_i X_i \qquad (13)$$

Then, to minimize the estimation method, the coefficient of equation 16 must be minimized to obtain a smaller difference between the real and the estimation equation. The residual error of the regression estimation can be obtained using the below equations:

$$\mathrm{Minimize}\, \sum_{i=1}^{n} e_i^2 \qquad (14)$$

$$e_i^2 - \mathrm{argmin} \sum_{i=1}^{n} (y_i - \hat{y}_i)^2 \qquad (15)$$

$$(\beta_0, \ldots \beta_i) = \mathrm{argmin}_{\beta_0, \ldots \beta_i} \left[\frac{1}{n}\sum_{i=1}^{n}\left(y_i - \hat{\beta}_0 - \hat{\beta}_1 \hat{X}_1 - \ldots - \hat{\beta}_i X_i\right)^2\right] \qquad (16)$$

Then, estimating the slope and the variance can be shown below:

$$\hat{\beta}_1 = (X^T X)^{-1} X^T y \qquad (17)$$

Using the above estimate, it can be inferred that the variance $\sigma^2$ in order to find the shadow fading parameter of the close-in and ABG models (equations 7, 10 and 11).

$$\hat{\sigma}^2 = \frac{1}{L-1}(y - X\hat{\alpha})^T (y - X\hat{\alpha}) \qquad (18)$$

Obtaining these parameters, leads one to build the path loss model that is comparable to the previously described models. Moreover, other machine learning algorithms can be used to develop an alternative procedure to enhance the estimation and solve other channel modeling issues.

Investigation of the channel modeling would allow other applications to interchange data to make the communication between them more precisely. Getting machine learning involved in a measurement from simulation or campaign with ML algorithms will provide homogeneous works and unbiased results. Machine learning algorithms are critical to the ability investigate the features of wireless channels deeply in MmWave. Machine learning is used to improve performance and reduce complexity. By using a measurements dataset, ML methods are applied to enhance the accuracy or to interpret/extend non-measured scenarios. Channel modeling parameters are generated by measurements campaigns or simulations and the propagated signal through a channel that gets disturbed by fading which leads to MPCs. The highest MPCs are the strongest links and from there, channel parameters can be obtained to create a dataset. An open source Matlab simulation and associated similar was modified, which was provided by New York University within their wireless lab, to meet the specifications of the present invention. Then, that simulation was used to obtain a sufficient amount of data to enhance the accuracy of the models. Then, we purposed methods of using multiple of machine learning techniques and the generated data and then do the interpretation of performance comparison between the algorithms to check the path loss model, as shown in the results section. The regression techniques in consideration include linear regression methods. Python was used to perform the data analysis. Table I exhibits that the channel measurement parameters of the data raw that was used for this disclosure. Regression is considered the main methods to investigate the relationship between the channel features. With the glory of having a large amount of data, the behavior of the wireless channel modeling becoming more interesting and obvious to obviate the complexity.

TABLE I

CHANNEL MEASUREMENT PARAMETERS.

| Parameters | Values |
| --- | --- |
| Distance (m) | 1-40 |
| Frequency (GHz) | 28 |
| Bandwidth (MHz) | 800 |
| TX Power (dBm) | 300 |
| Scenario | UMi |
| Polarization | Col-Pol |
| TxArray Type | ULA |
| RxArray Type | ULA |
| Antena | SISO |
| Tx/Rx antenna Azimuth and Elevation (red) | 10 |

The step following cleaning the data is to apply the machine learning scheme to initiate the learning process.

Then, a model can be used for predicting the path loss and evaluation of the model will be accomplished by Mean Absolute Error, Mean Squared Error, Root Mean Squared Error and R-square, as shown in the results section below.

Figure 2:
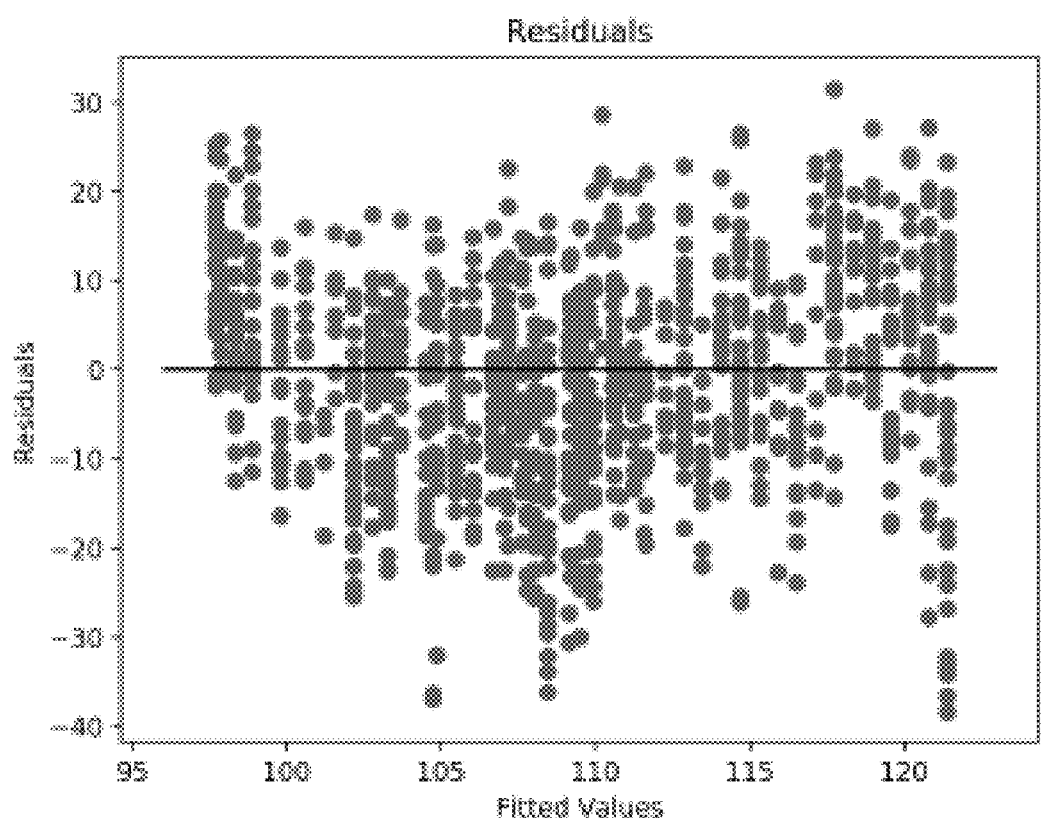
FIG. 2 is a plot illustrating residuals, in accordance with an embodiment of the present invention.

Checking the significant of the data is investigated by using residual plots, where the plot as shown in FIG. 2 demonstrates how the data is distributed among the horizontal line. As shown, it appears reasonably random. Thus, it confirms that the data used for regression is unbiased. A residual method is used to forecast errors which can be obtained by subtracting the forecast from the expected values.

Figure 3:
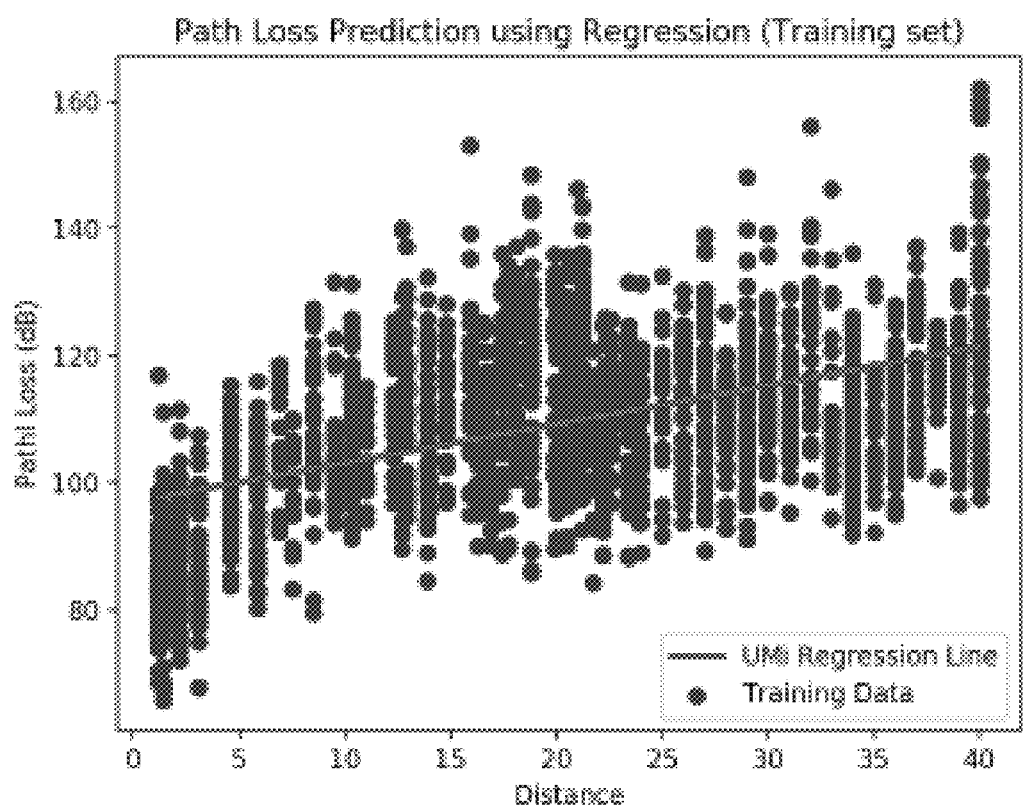
FIG. 3 is a plot illustrating path loss predictions using a linear regression algorithm and a training set, in accordance with an embodiment of the present invention.
Figure 4:
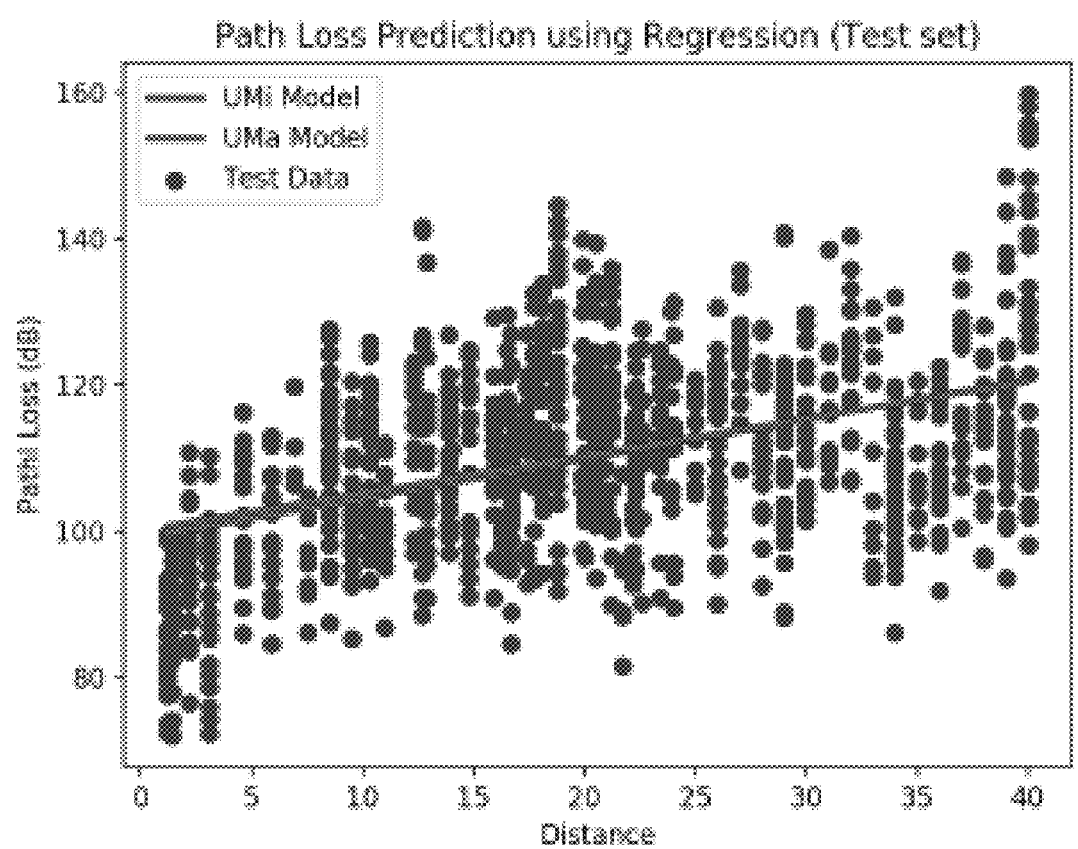
FIG. 4 is a plot illustrating path loss predictions using a linear regression algorithm and a test set, in accordance with an embodiment of the present invention.

FIG. 3 shows the prediction of the path loss using the linear regression method and the evaluation of this model is shown in Table II. While Table II explores the coefficient parameters of the Linear Regression (LR), Multiple Linear Regression (MLR1) and Multiple Linear Regression (MLR2). The second model (MLR1) is implemented with only three wireless channel features, while the third model (MLR2) utilizes eight features. FIG. 3 demonstrates two models, urban micro (UMa) and urban micro (UMi) of a wireless communication channel. The data belonging to UMi that was used to generate a regression line, while the regression line in the UMa model that was obtained from UMa scenario and then applied to the UMi. With the usage of different wireless channel features, Table II illustrates an adequate work by comparing the results of applying the model that were obtained from micro/urban environments with Table I specifications and applied it in the macro/urban communication. Thus, the wireless channel measurements can be reduced by applying a model from a single environment to others by applying machine learning techniques that can learn the logic.

TABLE II

COMMUNICATION SCENARIOS COMPARISON.

| Environment Scenario | UMi | UMa |
| --- | --- | --- |
| MAE | 8.92 | 6.66 |
| MSE | 126.60 | 74.32 |
| RMSE | 11.25 | 8.62 |
| R Square | 0.21 | 0.533 |
| Confidence | 0.21 | 0.533 |

As can be followed by equation 4 and 5, the estimated path loss model shown for linear regression and a single feature loss $L_0$ [dB] as the separated distance.

$$\hat{PL} = \alpha + 10 \log L_0 [dB](d) + X_\sigma [dB] \quad (19)$$

While for the model for multiple regression that consists of multiple wireless channel features loss $L_N$ [dB] as equation 7 proved, shown as:

$$\hat{PL} = \alpha + L_0 [dB] + L_1 [dB] + \ldots + L_9 [dB] + X_\sigma [dB] \quad (20)$$

Both parameters of the above two equations can be obtained from Tables III and IV. Moreover, using the statistical parameters Mean Absolute Error (MAE), Mean Squared Error (MSE), Root Mean Squared Error (RMSE) and R square ($R^2$) values level to achieve the significant of the predicted or the used model. RMSE is the square root of MSE and is used to check the accuracy of the wireless channel propagation prediction, where it measures the differences between the predicted and observed model and wherein a zero value indicates that the fit is optimum. Furthermore, these parameters can be used to validate the significance and check the accuracy of the proposed models. Table III illustrates the analysis of the results of the model prediction, where there are three models that can predict the path loss of an outdoor micro environment at 28 GHz. The features that are used in the second model are T-R Separation Distance (m), Time Delay (ns) and Received Power (dBm). While the third model's features are T-R Separation Distance (m), Time Delay (ns), Received Power (dBm), RMS Delay Spread (ns), Elevation AoD (degree), Azimuth AoD (degree) Azimuth AoA (degree) and Elevation AoA (degree). Then, these models are evaluated using Mean Absolute Error, Mean Squared Error, Root Mean Squared Error and R-square. From Table V, multiple linear regression with eight features performs the best among other models, which leads to increasing the feature enhance and prediction until the model reaches to the steady state. R-square particularly presents how the models improved with increasing the number of channel variables which provide an acceptable prediction result.

TABLE III

CHANNEL MEASUREMENT PARAMETERS FOR UMI COMMUNICATION.

| Test | LR | MLR | MLR |
| --- | --- | --- | --- |
| T-R Separation Distance (m) | 0.56 | 0.46 | 0.48 |
| Time Delay (ns) | — | −0.08 | −0.09 |
| Received Power (dBm) | — | −0.69 | −0.69 |
| RMS Delay Spread (ns) | — | — | −0.29 |
| Elevation AoD (degree) | — | — | −0.10 |
| Azimuth AoD (degree) | — | — | −0.002 |
| Azimuth AoA (degree) | — | — | −0.004 |
| Elevation AoA (degree) | — | — | −0.001 |

TABLE III

LINEAR REGRESSION MODEL.

| Environment | α | $L_0$ [dB] | $X_\sigma$ [dB] |
| --- | --- | --- | --- |
| Outdoor Micro Urban | 9.7 | .61 | 13.6 |

TABLE V

URBAN CHANNEL MEASUREMENT PARAMETERS.

| Test | Linear Regression | Multiple Linear Regession (3 Feature) | Multiple Linear Regession (7 Feature) |
| --- | --- | --- | --- |
| MAE | 8.92 | 6.66 | 5.10 |
| MSE | 126.60 | 74.32 | 44.51 |
| RMSE | 11.25 | 8.62 | 6.67 |
| R Square | 0.21 | 0.533 | 0.72 |

Figure 5:
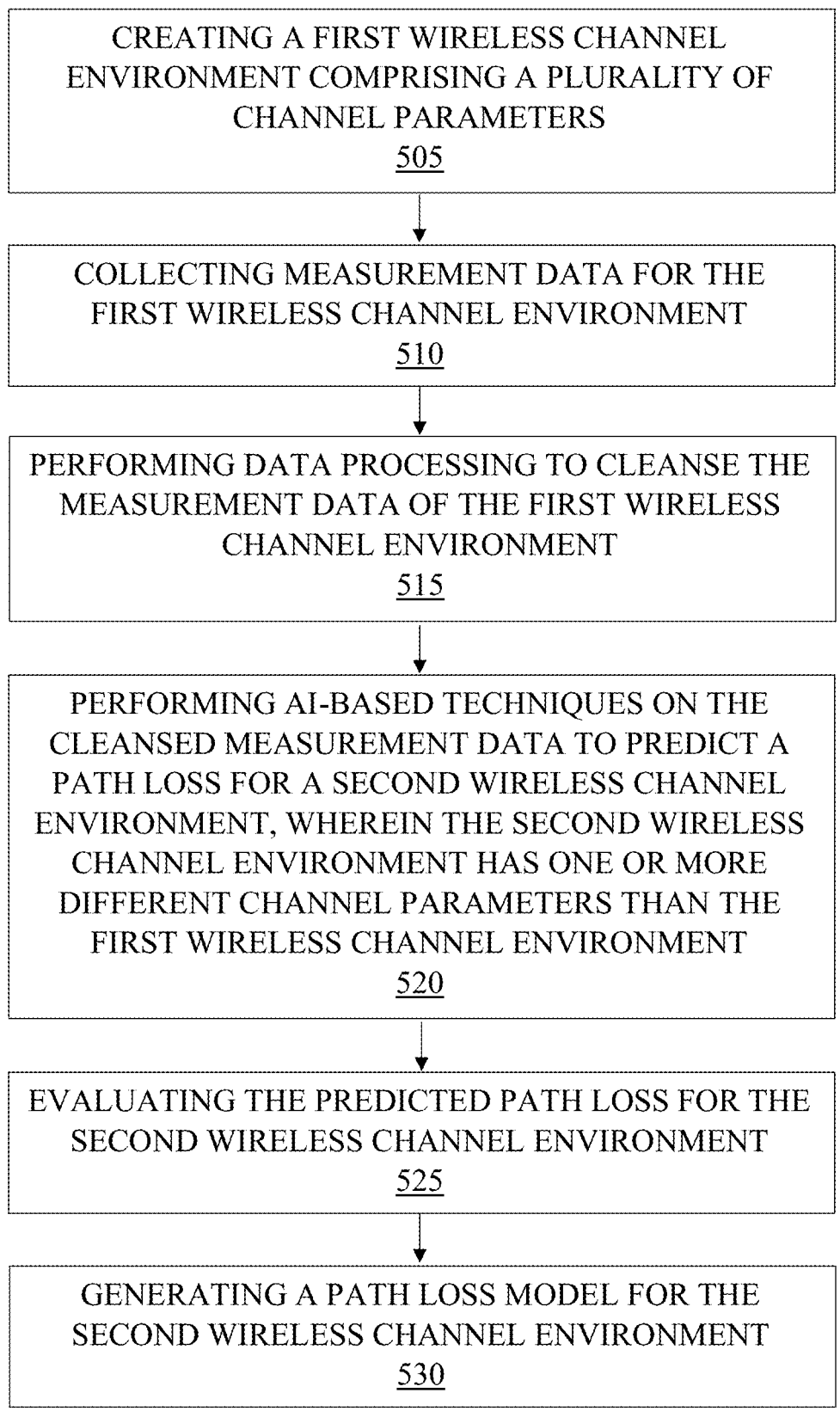
FIG. 5 is a flow diagram illustrating a method of predicting a path loss model for a second wireless channel environment based upon measurement data from a first wireless channel environment, in accordance with an embodiment of the present invention.

FIG. 5 illustrates the method steps of an embodiment of the present invention for predicting a path loss model in a wireless environment. At step 505, the method begins by creating a first wireless channel environment comprising a plurality of channel parameters. At step 510, the method continues by collecting measurement data for the first wireless channel environment. At step 515, the method proceeds by performing data processing to cleanse the measurement data of the first wireless channel environment and at step 52o by performing AI-based techniques on the cleansed measurement data to predict a path loss for a second wireless channel environment, wherein the second wireless channel environment has one or more different channel parameters than the first wireless channel environment. The method continues at step 525 by evaluating the predicted path loss for the second wireless channel environment and concludes at step 530 by generating a path loss model for the second wireless channel environment.

Inaccuracy, complexity and the number of measurements of the wireless communication environments have been not solvable issues for past decade. The disclosure of the present invention presents a new ML procedure to overcome these issues with the assistance of machine learning techniques. The traditional solutions provided by known wireless communication organizations have not sufficiently overcome these issues and with the new era of big data, the time has come to resolve them using machine learning algorithms. A new approach of applying supervised learning to model the wireless channel is described. Regression techniques have been used to overcome the channel modeling issues. Using the data of a particular communication environments, one can predict the model of a different communication scenario. Thus, the required number of measurements and the overall complexity have been reduced.

The present invention may be embodied on various computing platforms that perform actions responsive to software-based instructions. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object-oriented programming language such as Java, C#, C++, Visual Basic or the like and conventional procedural programming languages, such as the "C" programming language or similar programming languages.

It should be emphasized that the above-described embodiments of the present disclosure are merely possible examples of implementations set forth for a clear understanding of the principles of the disclosure. Many variations and modifications can be made to the above-described embodiment(s) without departing substantially from the spirit and principles of the disclosure. All such modifications and variations are intended to be included herein within the scope of this disclosure and protected by the following claims.

What is claimed is:

1. A computer implemented method for predicting a path loss model for a wireless channel, the method comprising:

creating a first wireless channel environment comprising a plurality of channel parameters;

collecting measurement data for the first wireless channel environment;

performing data processing to cleanse the measurement data of the first wireless channel environment;

performing AI-based techniques on the cleansed measurement data to predict a path loss for a second wireless channel environment, wherein the second wireless channel environment has one or more different channel parameters than the first wireless channel environment;

evaluating the predicted path loss for the second wireless channel environment; and generating a path loss model for the second wireless channel environment.

2. The method of claim 1, wherein the plurality of channel measurement parameters are selected from, distance, frequency, bandwidth, transmission power, scenario, polarization, transmission array type, receiver array type, antenna, antenna Azimuth and elevation.

3. The method of claim 1, wherein collecting measurement data for the first wireless channel environment comprises collecting measurement data using a wireless channel simulator.

4. The method of claim 1, wherein the measurement data is selected from T-R (transmitter-receiver) separation distance (m), time delay (ns), receiver power (dBm), RMS (root-mean-square) delay spread (ns), elevation AoD (degree), Azimuth AoD (degree), Azimuth AoA (degree) and elevation AoA (degree).

5. The method of claim 1, wherein the AI-based techniques are selected from linear regression, multiple linear regression, support vector machine regression, decision tree regression and random forest regression.

6. The method of claim 1, wherein evaluating the predicted path loss for the second wireless channel environment comprises using one or more of mean square error (MSE) and R-square comparison techniques.

7. The method of claim 1, wherein the first wireless channel environment is an urban macro channel environment and the second wireless channel environment is an urban micro channel environment.

8. A non-transitory computer-readable medium, the computer-readable medium having computer-readable instructions stored thereon that, when executed by a computing device processor, cause the computing device to:

create a first wireless channel environment comprising a plurality of channel parameters;

collect measurement data for the first wireless channel environment;

perform data processing to cleanse the measurement data of the first wireless channel environment;

perform AI-based techniques on the cleansed measurement data to predict a path loss for a second wireless channel environment, wherein the second wireless channel environment has one or more different channel parameters than the first wireless channel environment;

evaluate the predicted path loss for the second wireless channel environment; and generate a path loss model for the second wireless channel environment.

9. The non-transitory computer-readable medium of claim 8, wherein the plurality of channel measurement parameters are selected from, distance, frequency, bandwidth, transmission power, scenario, polarization, transmission array type, receiver array type, antenna, antenna Azimuth and elevation.

10. The non-transitory computer-readable medium of claim 8, wherein collecting measurement data for the first wireless channel environment comprises collecting measurement data using a wireless channel simulator.

11. The non-transitory computer-readable medium of claim 8, wherein the measurement data is selected from T-R (transmitter-receiver) separation distance (m), time delay (ns), receiver power (dBm), RMS (root-mean-square) delay spread (ns), elevation AoD (degree), Azimuth AoD (degree), Azimuth AoA (degree) and elevation AoA (degree).

12. The non-transitory computer-readable medium of claim 8, wherein the AI-based techniques are selected from linear regression, multiple linear regression, support vector machine regression, decision tree regression and random forest regression.

13. The non-transitory computer-readable medium of claim 8, wherein evaluating the predicted path loss for the second wireless channel environment comprises using one or more of mean square error (MSE) and R-square comparison techniques.

14. A system for predicting a path loss model for a wireless channel, the system comprising:

a processor; and a non-transitory computer-readable medium operably coupled to the processor, the computer-readable medium having computer-readable instructions stored thereon that, when executed by the processor, cause the system to;

create a first wireless channel environment comprising a plurality of channel parameters;

collect measurement data for the first wireless channel environment;

perform data processing to cleanse the measurement data of the first wireless channel environment;

perform AI-based techniques on the cleansed measurement data to predict a path loss for a second wireless channel environment, wherein the second wireless channel environment has one or more different channel parameters than the first wireless channel environment;

evaluate the predicted path loss for the second wireless channel environment; and generate a path loss model for the second wireless channel environment.

15. The system of claim 14, wherein the plurality of channel measurement parameters are selected from, distance, frequency, bandwidth, transmission power, scenario, polarization, transmission array type, receiver array type, antenna, antenna Azimuth and elevation.

16. The system of claim 14, wherein collecting measurement data for the first wireless channel environment comprises collecting measurement data using a wireless channel simulator.

17. The system of claim 14, wherein the measurement data is selected from T-R (transmitter-receiver) separation distance (m), time delay (ns), receiver power (dBm), RMS (root-mean-square) delay spread (ns), elevation AoD (degree), Azimuth AoD (degree), Azimuth AoA (degree) and elevation AoA (degree).

18. The system of claim 14, wherein the AI-based techniques are selected from linear regression, multiple linear regression, support vector machine regression, decision tree regression and random forest regression.

19. The system of claim 14, wherein evaluating the predicted path loss for the second wireless channel environment comprises using one or more of mean square error (MSE) and R-square comparison techniques.

* * * * *

UNITED STATES PATENT AND TRADEMARK OFFICE
CERTIFICATE OF CORRECTION

| | | |
|---|---|---|
| PATENT NO. | : 11,128,391 B1 | Page 1 of 1 |
| APPLICATION NO. | : 17/104764 | |
| DATED | : September 21, 2021 | |
| INVENTOR(S) | : Saud Mobark Aldossari and Kwang-Cheng Chen | |

It is certified that error appears in the above-identified patent and that said Letters Patent is hereby corrected as shown below:

In the Specification

Column 1, Line 10 should read:
their entirety. This work was sponsored with funding from Prince Sattam bin Abdulaziz University, Saudi Arabia.

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*